United States Patent
Akella et al.

(10) Patent No.: US 11,392,127 B2
(45) Date of Patent: Jul. 19, 2022

(54) TRAJECTORY INITIALIZATION

(71) Applicant: Zoox, Inc., Foster City, CA (US)

(72) Inventors: Abishek Krishna Akella, Pleasanton, CA (US); Janek Hudecek, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 73 days.

(21) Appl. No.: 16/160,493

(22) Filed: Oct. 15, 2018

(65) Prior Publication Data
US 2020/0117199 A1    Apr. 16, 2020

(51) Int. Cl.
| | | |
|---|---|---|
| *G05D 1/02* | (2020.01) | |
| *B60W 30/14* | (2006.01) | |
| *G05D 1/00* | (2006.01) | |
| *G01C 25/00* | (2006.01) | |

(52) U.S. Cl.
CPC ......... *G05D 1/0212* (2013.01); *B60W 30/143* (2013.01); *G01C 25/005* (2013.01); *G05D 1/0088* (2013.01); *G05D 1/0223* (2013.01); *G05D 1/0268* (2013.01); *G05D 2201/0213* (2013.01)

(58) Field of Classification Search
CPC ........ B60T 8/72; B61L 3/008; B61L 27/0027; B60W 30/143; B60W 2720/103; G05D 1/0088; G05D 1/0212; G05D 1/0214; G05D 1/0217; G05D 1/0221; G05D 1/0223; G05D 2201/0213
See application file for complete search history.

(56) References Cited

U.S. PATENT DOCUMENTS

| | | | | |
|---|---|---|---|---|
| 4,384,695 A | * | 5/1983 | Nohmi | B61L 3/12 246/182 B |
| 4,740,898 A | | 4/1988 | McKee et al. | |
| 5,233,526 A | * | 8/1993 | Detriche | G05D 1/0261 180/167 |

(Continued)

FOREIGN PATENT DOCUMENTS

| | | | | |
|---|---|---|---|---|
| DE | 102007036794 A1 | * | 2/2009 | ............ G01C 21/26 |
| EP | 539885 A2 | * | 5/1993 | |

(Continued)

OTHER PUBLICATIONS

Hebert, Martial H. et al., "Intelligent unmanned ground vehicles: Autonomous navigation research at Carnegie Mellon", Chapters 7 and 9, Copyright 1997 by Springer Science+Business Media, 76 pages (Year: 1997).*

(Continued)

*Primary Examiner* — David A Testardi
(74) *Attorney, Agent, or Firm* — Lee & Hayes, P.C.

(57) ABSTRACT

Trajectory determination for controlling a vehicle, such as an autonomous vehicle, is described. In an example, a vehicle system includes multiple planning systems for calculating trajectories. A first system may calculate first trajectories at a first frequency and the second system may calculate second trajectories at a second frequency and based on the first trajectories. The first and/or second trajectories may be initialized at states of the vehicle corresponding to a projection onto a previous-in-time respective first or second trajectory. The second trajectories may be control trajectories along which the vehicle is controlled.

20 Claims, 4 Drawing Sheets

(56) References Cited

U.S. PATENT DOCUMENTS

| | | | |
|---|---|---|---|
| 6,314,347 B1* | 11/2001 | Kuroda | B60L 50/61 |
| | | | 701/22 |
| 6,529,814 B2 | 3/2003 | Ishizu et al. | |
| 7,734,387 B1* | 6/2010 | Young | G05D 1/0214 |
| | | | 701/23 |
| 8,620,517 B2 | 12/2013 | Caveney et al. | |
| 9,120,485 B1* | 9/2015 | Dolgov | B60W 30/10 |
| 9,567,004 B1* | 2/2017 | Jhang | B62D 6/003 |
| 2009/0076667 A1* | 3/2009 | Otsubo | B61L 3/006 |
| | | | 701/2 |
| 2011/0029235 A1* | 2/2011 | Berry | G05D 1/0204 |
| | | | 701/408 |
| 2012/0203440 A1* | 8/2012 | Matsunaga | B60W 10/06 |
| | | | 701/93 |
| 2015/0168157 A1* | 6/2015 | Hoch | G08G 1/0112 |
| | | | 701/400 |
| 2015/0185028 A1* | 7/2015 | Kinoshita | G01C 21/3484 |
| | | | 701/400 |
| 2015/0224992 A1* | 8/2015 | Dornieden | B60W 30/143 |
| | | | 701/1 |
| 2015/0346723 A1* | 12/2015 | Pedersen | B60W 30/10 |
| | | | 701/25 |
| 2016/0082947 A1* | 3/2016 | Naumann | G05D 1/0217 |
| | | | 701/22 |
| 2017/0120909 A1* | 5/2017 | On | B60W 30/12 |
| 2017/0227959 A1* | 8/2017 | Lauffer | G05D 1/0061 |
| 2017/0277192 A1* | 9/2017 | Gupta | B60W 30/20 |
| 2018/0188031 A1* | 7/2018 | Samper | B60W 30/0953 |
| 2018/0284775 A1* | 10/2018 | Brettschneider | G05D 1/0214 |
| 2018/0307233 A1* | 10/2018 | Zhu | G01C 21/3415 |
| 2019/0009783 A1* | 1/2019 | Kawasaki | B60W 60/0011 |
| 2019/0031174 A1* | 1/2019 | Adachi | B60W 30/18154 |
| 2019/0064813 A1* | 2/2019 | Binet | G05D 1/0212 |
| 2019/0084561 A1* | 3/2019 | Takeda | B60W 30/14 |
| 2019/0179330 A1* | 6/2019 | Oniwa | G05D 1/0223 |
| 2019/0220012 A1* | 7/2019 | Zhang | B62D 15/025 |
| 2019/0250624 A1* | 8/2019 | Sunil Kumar | G01C 21/26 |
| 2019/0344783 A1* | 11/2019 | Bertollini | B60W 40/06 |
| 2019/0346851 A1* | 11/2019 | Liu | G05D 1/0214 |
| 2019/0367018 A1* | 12/2019 | Ishioka | B60W 30/143 |
| 2020/0026296 A1* | 1/2020 | Hoedt | B60W 50/06 |
| 2020/0057447 A1* | 2/2020 | Kato | B60W 30/10 |
| 2021/0188268 A1* | 6/2021 | Goto | G08G 1/052 |
| 2021/0237769 A1* | 8/2021 | Ostafew | B60W 30/18163 |
| 2022/0042808 A1* | 2/2022 | Hellgren | G01C 21/3453 |

FOREIGN PATENT DOCUMENTS

| | | | |
|---|---|---|---|
| JP | 2001045616 A | * | 2/2001 |
| JP | 2002118908 A | * | 4/2002 |
| WO | WO-2015/178839 A1 | * | 11/2015 |

OTHER PUBLICATIONS

Lundgren, Martin, "Path tracking fora miniature robot", excerpts from Master's Thesis, Umea University, Sweden, 2003, 9 pages (Year: 2003).*

Doe, "21st Century Locomotive Technology, Quarterly Technical Status Report 11", Report No. DOE-AL68284-TSR11,Feb. 14, 2006, pp. 1-8, downloaded from http://www.osti.gov/energycitations/servlets/purl/876101-8xDULv/876101.pdf (Year: 2006).*

The PCT Search Report and Written OPinion dated Jan. 30, 2020 for PCT Application No. PCT/US19/56280, 9 pages.

The International Preliminary Report on Patentability dated Apr. 29, 2021 for PCT Application No. PCT/US19/56280, 7 pages.

* cited by examiner

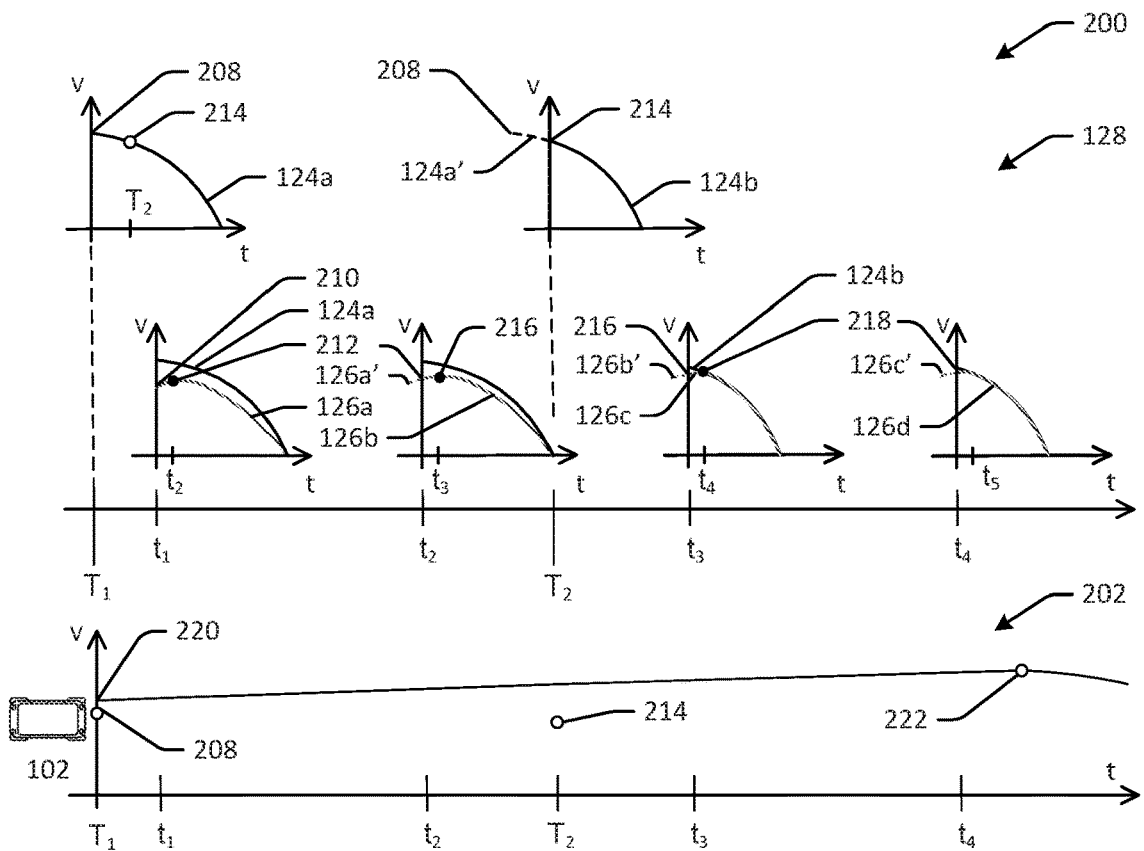
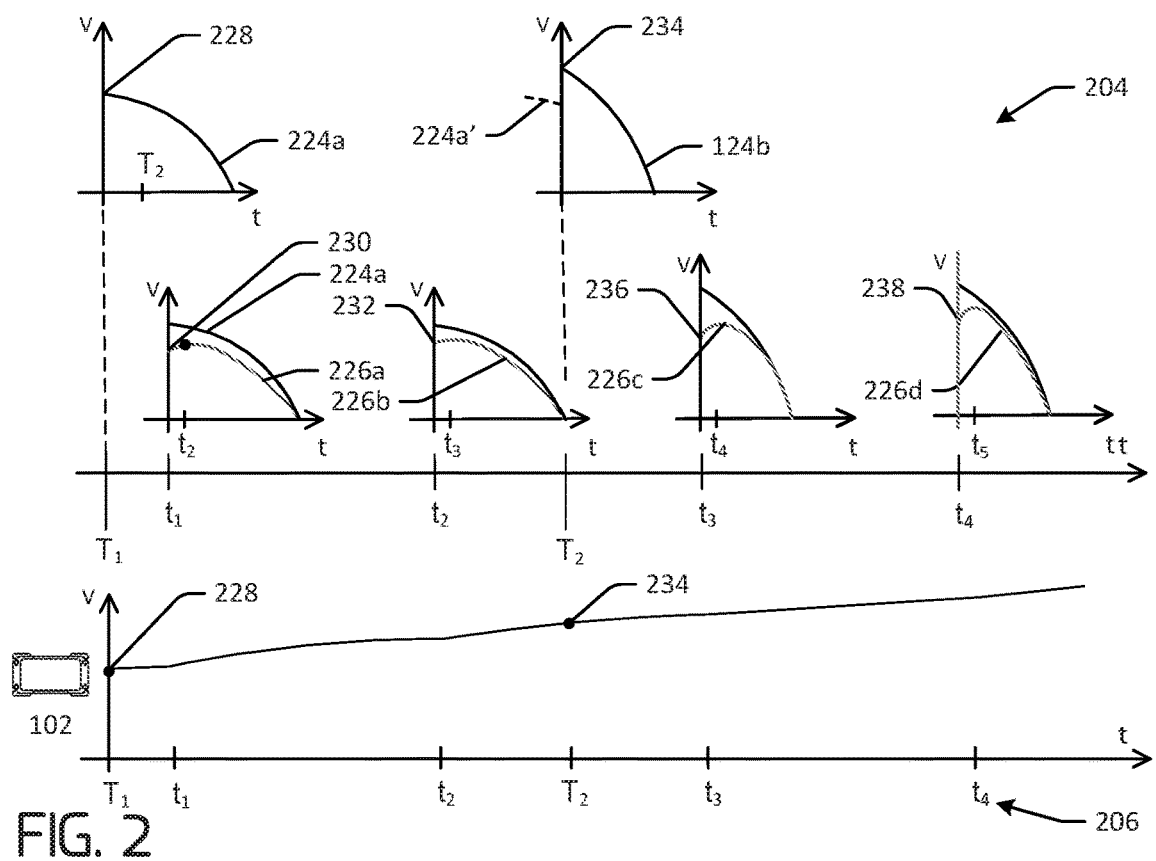
FIG. 2

TRAJECTORY INITIALIZATION

BACKGROUND

Planning systems in autonomous and semi-autonomous vehicles determine trajectories along which the vehicle may be controlled. For example, control trajectories may be generated to slow down and/or stop for crossing pedestrians, for traffic signals, for decelerating vehicles, or the like. Similarly, vehicles may be controlled to accelerate, e.g., to merge into traffic, when an intersection clears, when the speed limit increases, or the like. Control trajectories may also determine controls for steering and/or controlling other aspects of the vehicle. However, conventional models may over- or under-estimate an actual state of the vehicle, which may result in abrupt acceleration or deceleration, failure to completely stop, stopping short of a preferred destination, accelerating at a slower rate than is desired, over-steering, under-steering, or the like. In some cases, such models may result in an unpleasant experience for the rider, unnecessary wear on the vehicle and/or its components, and/or a failure to comply with traffic rules and regulations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a collection of graphs illustrating trajectory initialization and generation for vehicle control as described herein.

DETAILED DESCRIPTION

Figure 1:
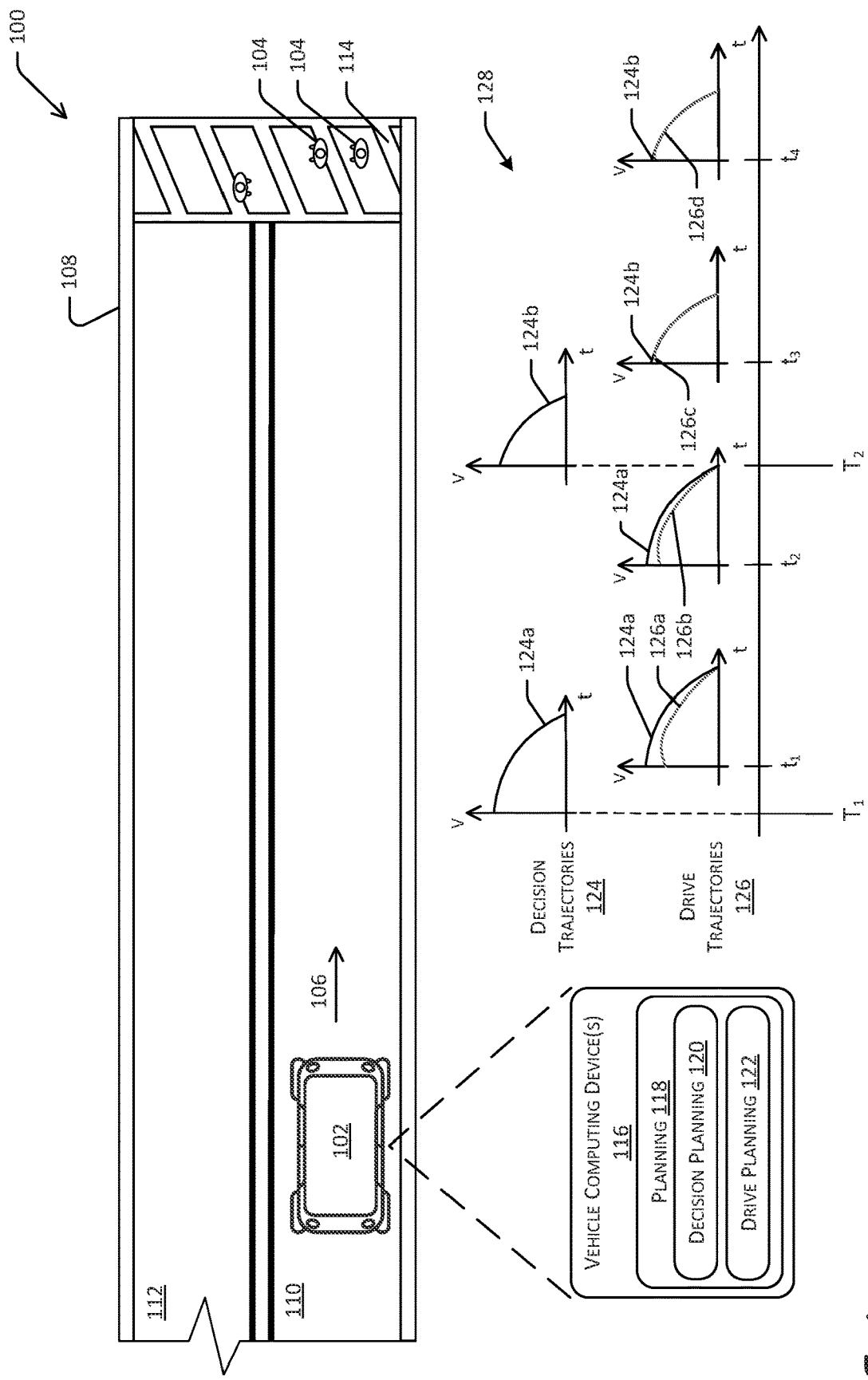
FIG. 1 is a schematic diagram illustrating an example implementation of trajectory initialization and generation for vehicle control in an environment as described herein.

Techniques described herein are directed to generating trajectories for controlling a vehicle, such as an autonomous vehicle. For example, autonomous vehicles may determine a current state of a vehicle, e.g., a velocity, acceleration, position, and/or orientation of the vehicle based on sensors associated with the vehicle. A planning system may generate one or more trajectories based on the current state and other information. A drive system may control the vehicle according to the one or more trajectories.

In some implementations, the vehicle may include, or receive information from, the planning system. The planning system may include multiple layers for generating trajectories to control the vehicle. For instance, the planning system may include a high-level route planning system that determines a general drive path, e.g., from a current location to a destination. The planning system may also include a decision planning system and a drive planning system. The decision planning system may determine decision trajectories that generally include trajectories for travelling along segments or portion of the drive path. The drive planning system may determine drive trajectories based on the decision trajectories, e.g., the drive trajectories may closely approximate the decision trajectories. In some instances, the drive trajectories may be smoothed or otherwise modeled to increase rider comfort, to increase efficiency of the vehicle, to decrease wear on the vehicle, in accordance with capabilities or limitations of the vehicle, or in other ways. The drive system may control the vehicle according to the drive trajectories.

In some implementations described herein, the decision planning system and the drive planning system may operate at different frequencies. For example, the decision planning system may determine decision trajectories at a lower frequency than the drive planning system determines drive trajectories. In this manner, multiple drive trajectories may be determined for each decision trajectory. In some examples, the decision planning system may operate at about 1 Hz to about 20 Hz. The drive planning system may operate at about 30 Hz to about 80 Hz, for example.

In some implementations, the decision planning system may initialize decision trajectories using previous decision trajectories. For example, the decision planning system may project onto a most-recently generated decision trajectory to determine an initialization state for a next decision trajectory. In some instances, the initialization state at a time $T_1$ may be a projected state of the vehicle on a decision trajectory determined at the time $T_0$. Similarly, the drive planning system may initialize decision trajectories using previous drive trajectories. For example, the drive planning system may project onto a most-recently generated decision trajectory to determine an initialization state for a next drive trajectory. In some examples, the initialization state at time $t_1$ may be a projected state of the vehicle on a decision trajectory determined at the time $t_0$.

The drive system may execute the drive trajectories at the vehicle. For example, the drive system may control drive modules and/or system controllers to cause the vehicle to traverse along the drive trajectories. The drive system may also include an execution module that receives sensor data and confirms whether the vehicle is following the drive trajectory. The drive system may correct controlling of the vehicle based on an output from the execution module, for example. In some implementations, the execution system may operate at a third frequency, which may be higher than the frequency at which the drive planning system operates.

The systems and techniques described herein are distinct from previous systems, in that previous systems may initialize trajectories based on an actual pose of the vehicle. For instance, using an actual pose of the vehicle to determine a decision trajectory, drive trajectories may be calculated that require unnecessary acceleration or deceleration, steering, or the like, as the drive trajectories continue to attempt to conform to a trajectory based on the actual pose, despite the drive trajectories being initialized from a different initialization state. For example, in previous systems, if the vehicle was going faster than a control or drive trajectory assumed, the result could be continued acceleration of the vehicle, even if the decision trajectory was to bring the vehicle to a stop. Similarly, when accelerating, if the vehicle was going slower than the drive trajectory initialization state assumed, the vehicle would accelerate at a slower than desired acceleration, or decelerate, to conform to the decision trajectory. Thus, unlike conventional systems, aspects of this disclosure may determine better initialization states for determining decision and/or drive trajectories. Techniques described herein may result in a smoother ride for passengers and increased safety for the autonomous vehicle and/or objects in the environment.

Techniques described herein are directed to leveraging sensor and perception data to enable a vehicle, such as an autonomous vehicle, to navigate through an environment providing a pleasant riding experience. Techniques described herein can utilize information to determine multiple trajectories for controlling the vehicle in the environment in a more efficient manner and/or with increased comfort to passengers than with existing navigation techniques. For example, techniques described herein may provide a technological improvement over existing prediction and navigation technology. In addition to improving the accuracy with which sensor data can be used to determine the vehicle trajectory, techniques described herein can provide a smoother ride and improve safety outcomes by, for example, more accurately determining safe operation for reaching an intended destination. Techniques described herein may also reduce component wear and energy requirements associated with the vehicle. For example, existing techniques may more harshly brake and/or accelerate, putting additional and unnecessary stress on vehicle components.

Figure 3:
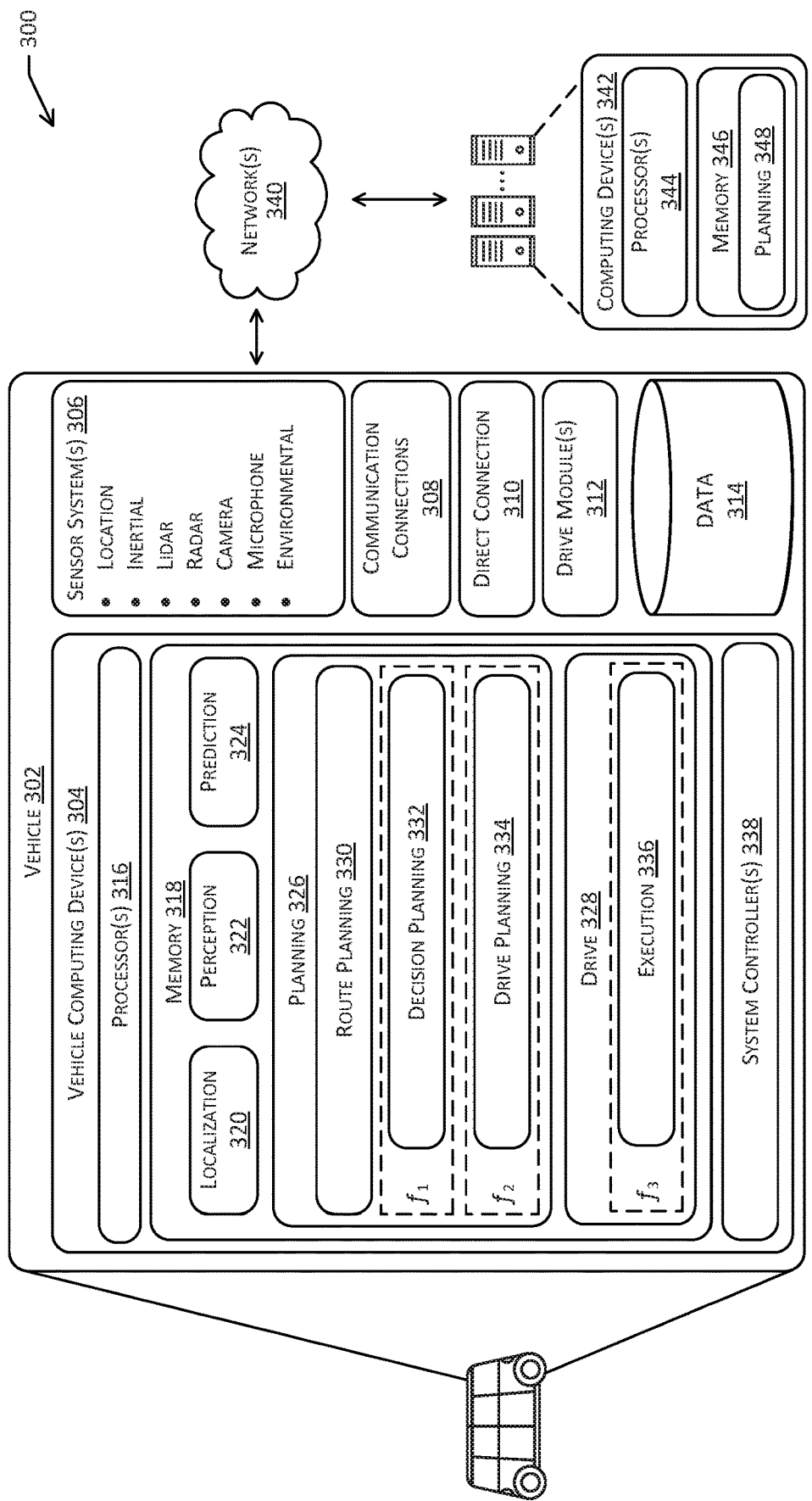
FIG. 3 is a block diagram illustrating an example computing system for trajectory initialization and generation as described herein.

FIGS. 1-3 provide additional details associated with techniques described herein.

FIG. 1 is a schematic diagram illustrating an example implementation of trajectory initialization for generating trajectories to control a vehicle through an environment as described herein. More specifically, FIG. 1 illustrates an example environment 100 in which a vehicle 102 is operating. In the illustrated example, the vehicle 102 is driving in the environment 100, although in other examples the vehicle 102 may be stationary and/or parked in the environment 100. In the illustrated embodiment, one or more objects, or agents, also are in the environment 100. For instance, FIG. 1 illustrates three pedestrians 104a, 104b, 104c (collectively, the "pedestrians 104"). Although not illustrated, any number and/or type of agents, including static agents, e.g., road signs, parked vehicles, fire hydrants, buildings, curbs, or the like, and/or dynamic agents, e.g., pedestrians, animals, cyclists, trucks, motorcycles, other vehicles, or the like, can additionally or alternatively be present in the environment 100.

The vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

More specifically, FIG. 1 illustrates a scenario in which the vehicle 102 is travelling through the environment 100, generally in the direction of arrow 106. The vehicle 102 is travelling on a road 108 having a first lane 110 and a second lane 112. The vehicle 102 is in the first lane 110 approaching a crosswalk 114 in which the pedestrians 104 are crossing the road 108. Because the pedestrians 104 are in the crosswalk 114, the vehicle 102 must be controlled to slow, and potentially stop, until the crosswalk 114 clears. For instance, one or more vehicle computing devices 116 may receive sensor data indicative of a position and/or movement of the pedestrians 104 and generate controls for decelerating the vehicle 102. In the example of FIG. 1, the vehicle computing device(s) 116 may determine one or more trajectories along which the vehicle 102 may decelerate in view of the pedestrians 104.

In the illustrated example, the vehicle computing device(s) 116 may include a planning system 118 for determining the trajectories along which the vehicle will decelerate. The planning system may include a first planning system, e.g., a decision planning system 120, and a second planning system, e.g., a drive planning system 122. The decision planning system 120 may be configured to determine first, decision trajectories 124, which may be first planned trajectories and the drive planning system 122 may be configured to determine second, drive trajectories 126, which may be second planned trajectories. In implementations described herein, the decision trajectories 124 may be iteratively determined at a first frequency and the drive trajectories 126 may be determined at a second frequency. For example, the drive trajectories 126 may be determined at a higher frequency, and may be at least in part based on the last-determined decision trajectory 124. For instance, the drive trajectories 126 may be executed by one or more drive and/or control systems of the vehicle 102, as described further herein.

FIG. 1 includes a timeline 128 illustrating trajectory generation according to techniques described herein. More specifically, the timeline 128 illustrates two of the first, decision trajectories 124a, 124b (collectively, the decision trajectories 124) generated by the decision planning system 120 and four of the second, drive trajectories 126a, 126b, 126c, 126d (collectively, the drive trajectories 126) generated by the drive planning system 122. The decision trajectories 124 are determined at a first frequency, e.g., iteratively at a first period T. Accordingly, the first decision trajectory 124a is determined at a first time $T_1$ and the second decision trajectory 124b is determined at a time $T_2$, a period T after the first time $T_1$. Similarly, the second drive trajectories 126 are determined at a second frequency, e.g., iteratively at a second period t. Accordingly, the first drive trajectory 126a is determined at a second time $t_1$, the second drive trajectory 126b is determined at a time $t_2$, a period t after the second time $t_1$, the third drive trajectory 126c is determined at a time $t_3$, the period t after the time $t_2$, and the fourth drive trajectory 126d is determined at a time $t_4$, the period t after the time $t_3$. The first and second periods T, t are for illustration only. By way of non-limiting example, while the first period T is illustrated as being approximately double the second period t, in other examples, the second period t may be smaller, e.g., such that additional drive trajectories 126 are determined before a successive decision trajectory 124 is determined, as described herein. In other examples, the decision planning system 120 and the drive planning system 122 may operate at different frequencies, including the same frequency.

In the example of FIG. 1, the trajectories 124, 126 are illustrated as velocity profiles, e.g., showing a planned velocity for the vehicle 102 over a future time horizon. Specifically, in FIG. 1, the velocity profiles include only speed, although the velocity profiles may also include direction. Though depicted as a single velocity (or speed) profile, such depictions are for illustrative purposes as vehicle state may include position in any of an x-, y-, z-direction, orientation in any of a roll, pitch, or yaw direction, speeds, velocities in any one or more of an x-, y-, z-direction, or accelerations in any one or more of an x-, y-, z-direction and the like. As illustrated in FIG. 1, the first decision trajectory 124a shows a velocity (or speed) profile for the vehicle 102 that will have the vehicle decelerate from a current state (e.g., a current speed or a current velocity) to stop short of the crosswalk 114. For example, the decision planning system 120 may determine the first decision trajectory 124a upon receiving information from one or more sensors indicating that the pedestrians 104 are at or in the crosswalk 114. In other examples, the decision planning system 120 may receive additional information from another system, e.g., a route planning system, that generates a command to stop the vehicle. The decision planning system 120 may also receive information about the current state of the vehicle 102 to determine an initialization state—in the example of FIG. 1, an initialization velocity (which may include a speed and/or direction). For example, the initialization velocity may be based at least in part on a current pose of the vehicle, a current velocity (which may include a speed and/or direction) of the vehicle, a current acceleration of the vehicle, or other information determined by one or more sensor systems associated with the vehicle 102. The sensor system(s) can include, but is/are not limited to, light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc.

In the example, the first decision trajectory 124a may be a high-level determination for guiding the autonomous vehicle 102 to a stop before the crosswalk 114. That is, the first decision trajectory 124a may be a first planned trajectory that does not take into account agents in the environment other than the pedestrians 104, may not take into account the safety and/or comfort of passengers in the vehicle, may not take into account the physical capabilities of the vehicle, and/or the like. Moreover, the decision trajectories may be determined in a first reference frame, e.g., a global coordinate system, a first inertial reference frame (e.g., a first inertial reference frame relative to the vehicle state as determined (known) by the decision layer), etc.

In some implementations, the drive planning system 122 may receive or otherwise obtain information about the first decision trajectory 124a and generate one or more of the drive trajectories 126 based thereon for controlling the vehicle 102 in the environment 100. For example, the drive planning system 122 can access, receive, and/or determine real-time processed sensor data to determine object(s), like the pedestrians 104 in the environment 100, as well as any other objects in the environment that may affect travel. Moreover, the drive planning system 122 may determine drive trajectories as second planned trajectories taking into account additional information, such as passenger preferences (e.g., turning radiuses, a ride smoothness, or the like), wear on the vehicle, capabilities of the vehicle, or the like. In the at least one example, the drive planning system 122 can process the instruction in view of the real-time processed sensor data and determine the drive trajectories 126. Moreover, the drive planning system 122 may determine the drive trajectories 126 in a different reference frame than the decision planning system 120 determines the decision trajectories 124. For example, the drive trajectories 126 may be determined in an inertial reference frame (e.g. a second inertial reference frame, or otherwise a reference frame relative to a vehicle state as determined (known) by the drive layer), etc. Each of the decision trajectories 124 and the drive trajectories 126 may be determined from respective initialization states, e.g., initialization velocities in the illustrated example. Thus, at each time T, the decision planning system 120 determines a state at which to begin the decision trajectory, and, at each time t, the drive planning system 122 determines a state at which to begin the drive trajectory. Of course, though depicted herein as a single dimension (speed), any number of dimensions may be used for determining such an initial state, as described in detail herein. As shown, at take-off, e.g., when the vehicle starts from a stopped position, the initialization state may be the same for both the decision trajectories 124 and the drive trajectories 126, e.g., a zero-velocity state, but as the vehicle 102 travels through the environment, the initialization states for the drive and decision trajectories may vary, as described herein. In the example of FIG. 1, and as shown in the timeline 128, the vehicle is moving, and the initialization states for the decision and drive trajectories are different. As described further herein, the initialization states may be based on one or more of a current state of the vehicle and/or a previous trajectory.

Each of the decision trajectories 124 and the drive trajectories 126 may be determined from respective initialization states, e.g., initialization velocities in the illustrated example. Thus, at each time T, the decision planning system 120 determines a state at which to begin the decision trajectory, and, at each time t, the drive planning system 122 determines a state at which to begin the drive trajectory. Of course, though depicted herein as a single dimension (velocity), and number of dimensions may be used for determining such an initial state, as described in detail herein. As shown, at take-off, e.g., when the vehicle starts from a stopped position, the initialization state may be the same for both the decision trajectories 124 and the drive trajectories 126, e.g., a zero-velocity state, but as the vehicle 102 travels through the environment, the initialization states for the drive and decision trajectories may vary, as described herein. In the example of FIG. 1, and as shown in the timeline 128, the vehicle is moving, and the initialization states for the decision and drive trajectories are different. As described further herein, the initialization states may be based on one or more of a current state of the vehicle and/or a previous trajectory.

Thus, in the example of FIG. 1, at $T_1$, the decision planning system 120 can determine a decision initialization state, e.g., an initialization velocity, and a trajectory from that decision initialization state. The first decision trajectory 124a generally includes a velocity profile for proceeding from the initialization state, e.g., the initialization velocity, to the stopped position at which the decision trajectory 124a terminates. As also illustrated by the timeline 128, at $T_2$, the decision planning system 120 can also determine a second decision initialization state, e.g., an initialization velocity, and trajectory from that second decision initialization state. The initialization states may be based on at least one of an actual state of the vehicle 102 and/or a previous decision trajectory, as detailed further herein.

As also illustrated by the timeline 128, at $t_1$, the drive planning system 122 can determine the first drive trajectory 126a from a first drive initialization state, e.g., an initialization velocity. The first drive trajectory 126a generally includes a velocity profile for proceeding from the initialization state, e.g., the initialization velocity, to the stopped position at which the drive trajectory 126a terminates. As illustrated, the drive initialization velocity may be different from the decision initialization velocity, because, as described herein, the drive planning system 122 may be configured to perform different functions and/or control the vehicle 102 according to other rules and/or constraints that may cause the vehicle to diverge from the decision trajectory 124a. By way of non-limiting example, the drive planning system 122 may be constrained by one or more smoothing functions that may prevent the vehicle from following a decision trajectory exactly. The smoothing function(s) may take into account wear on the vehicle 102, rider comfort, rules of the road, and/or other parameters. Thus, the drive planning system 122 generates drive trajectories 126 that may attempt to follow the decision trajectories 124, but in practice may be bound by constraints that result in slightly different results. In some instances, the decision planning system 120 and the drive planning system 122 may generate trajectories in different reference frames (which may be, for example, relative reference frames as determined by each system).

As also illustrated in the timeline 128, the second drive trajectory 126b may also be determined from an initialization velocity, at time $t_2$, and, like the first drive trajectory 126a, the second drive trajectory may be based at least in part on the first decision trajectory 124a, e.g., because the first decision trajectory 124a is the most-recently determined decision trajectory. The third drive trajectory 126c may also be determined from an initialization velocity, at time $t_3$, and the fourth drive trajectory 126d may also be determined from an initialization velocity, at time $t_4$. The third drive trajectory 126c and the fourth drive trajectory 126d may be based at least in part on the second decision trajectory 124b, which is generated subsequent to generating the second drive trajectory 126b, but prior to generating the third drive trajectory 126c, for example. The initialization velocity (or state) may be determined (or otherwise received) at each point in time in accordance with the techniques described herein. The timeline 128 will be described in more detail in FIG. 2.

More specifically, FIG. 2 illustrates a collection 200 of timelines illustrating trajectory initialization and generation. The timelines include the timeline 128 from FIG. 1, a first vehicle velocity timeline 202 showing a velocity of the vehicle 102 as it is controlled according to the trajectories set forth in the timeline 128, a second control timeline 204 illustrating an alternative method of trajectory initialization and control, and a second vehicle velocity timeline 206 showing a velocity of the vehicle 102 as it is controlled according to the second control timeline 204. The timelines 128, 202, 204, 206 may illustrate differences resulting from using two types of initialization states, as described further herein.

The timeline 128 from FIG. 1 is reproduced in FIG. 2 in more detail. The reference numerals introduced in FIG. 1 are also used in FIG. 2 to show the same features, e.g., the decision trajectories 124 and the drive trajectories 126. As illustrated and introduced above, at $T_1$, the decision planning system 120 can determine a first initialization velocity 208 and the first decision trajectory 124a as a velocity profile for decelerating from the first initialization velocity 208 to a stop before the vehicle 102 reaches the crosswalk 114.

At $t_1$, the drive planning system 122 can determine the first drive trajectory 126a from a first drive initialization state, e.g., a first initialization velocity 210. The first drive trajectory 126a generally includes a velocity profile for proceeding from the initialization state, e.g., the initialization velocity 210, to the stopped position at which the first drive trajectory 126a terminates. As illustrated, the drive initialization velocity may be different from the decision initialization velocity, because, as described herein, the drive planning system 122 may be configured to perform different functions and/or control the vehicle 102 according to other rules and/or constraints that may cause the vehicle to diverge from the decision trajectory 124a. By way of non-limiting example, the drive planning system 122 may be constrained by one or more smoothing functions that may prevent the vehicle from following a decision trajectory exactly. Thus, the first drive trajectory 126a is initialized at a lower velocity than the first decision trajectory 124a, but is determined as a trajectory that attempts to approximate the first decision trajectory 124a. Accordingly, the first drive trajectory is based at least in part on the first drive initialization velocity 208 and the first decision trajectory 124a, e.g., because the first decision trajectory is the most-recently calculated one of the decision trajectories 124.

In the illustrated embodiment, the first decision initialization velocity 208 is higher than the first drive initialization velocity 210. Accordingly, the drive planning system 122 may generate the first drive trajectory 126a as a velocity profile that includes an initial acceleration, e.g., to attempt to move the vehicle 102 to a state (velocity in this instance) that matches a state on the first decision trajectory 124a. Once the first drive trajectory 126a is determined, the vehicle 102, e.g., via a controller or the like, may control the vehicle according to the first drive trajectory 126a, until the next drive trajectory, e.g., the second drive trajectory 126b, is calculated.

As noted above, the drive planning system 122 calculates new drive trajectories 126 at a predetermined frequency. Thus, in the example of FIGS. 1 and 2, the first drive trajectory 126a is calculated at a time $t_1$ and the second drive trajectory 126b is calculated at time $t_2$, which is $t_1$ plus the period, t. The second drive trajectory 126b includes another velocity profile, which again attempts to conform the movement of the vehicle 102 to the first decision trajectory 124a (e.g., because the first decision trajectory 124a is the most-recently determined decision trajectory). Because the vehicle has moved from the time $t_1$ to the time $t_2$, however, the second drive trajectory 126b may be initialized at a second drive initialization state, e.g., a second drive initialization velocity 212. In examples described herein, the second drive initialization velocity 212 may be a projection of the vehicle 102 onto a previously-determined drive trajectory. For example, a point 212 shown on the first drive trajectory 126a corresponds to the position on the trajectory at the time $t_2$. More specifically, the point 212 represents a spatial projection of the vehicle 102 state onto the first drive trajectory 126a at the time $t_2$. Thus, for example, a state of the vehicle may be determined, e.g., by a localization system, at a predetermined frequency. In some examples, the frequency at which the vehicle state is determined may be higher than a frequency at which the drive trajectories 126 are determined. Thus, for example, a most-recently determined vehicle state, e.g., most recent before the time $t_2$, may be projected onto the most-recent drive trajectory, e.g., the first drive trajectory 126a in this instance, to determine the second drive initialization state 212. In the illustrated example, and because velocity is a single-dimension parameter, the projection of the current vehicle state may be the velocity the vehicle 102 would have if the vehicle 102 were to follow the first drive trajectory 126a exactly (e.g., the velocity defined by the drive trajectory 126a corresponding to the time $t_2$). However, in other instances, the projected state (initialization) may differ based on the nature of the spatial projection used. For example, the spatial projection may vary based on a frequency at which the vehicle state is determined, parameters of a tracker and/or controller of the vehicle that may keep the vehicle on the drive trajectory 126, a number of parameters of the state estimated and/or provided in the trajectory, or other factors.

As noted above, FIG. 2 uses the reference numeral 212 to show the second initialization velocity for the second drive trajectory 126b. From the second initialization state, e.g., the second initialization velocity 212, the drive planning system 122 determines the second drive trajectory 126b, e.g., as another trajectory for closely approximating the first decision trajectory 124a. To further illustrate the use of the projection of the vehicle onto the first drive trajectory 126a, FIG. 1 also shows an elapsed portion 126a' of the first drive trajectory 126a on the velocity profile generated as the second drive trajectory 126b. Specifically, the elapsed portion 126a' corresponds to the portion of the first drive trajectory 126a between the first initialization velocity 210 and the point 212.

As with the first drive trajectory 126a, the second drive trajectory 126b begins with an increased velocity from the second initialization velocity 212, e.g., as the second drive trajectory 126b progresses toward the first decision trajectory 124a. The result of following the drive trajectories 126 with the vehicle 102 are illustrated in the first vehicle velocity timeline 202, discussed further below.

In the example of FIG. 2, the decision planning system 120 may operate at about half the frequency of the drive planning system 122. Thus, before the drive planning system 122 generates the third drive trajectory 126c, the decision planning system 120 may determine the second decision trajectory 124b. As will be appreciated, in other implementations, the frequency at which the decision planning system 120 determines the decision trajectories 124 and the frequency at which the drive planning system 122 determines the drive trajectories 126 may be different, e.g., such that more or fewer drive trajectories 126 are determined before a subsequent decision trajectory 124 is determined.

In some implementations of this disclosure, a second decision initialization state for the second decision trajectory 124b may be determined in a manner similar to the manner in which the second initialization state for the second drive trajectory 126b was determined. For example, an initialization velocity 214 for the second decision trajectory 124b may be a velocity (e.g., an actual velocity of the vehicle determined by a localization system) projected onto the first decision trajectory 124a, e.g., at the time $T_2$. In this example, the projected velocity is shown as the point 214 on the first decision trajectory 124a. Both the projected point on the first decision trajectory 124a and the second initialization velocity are labelled with the same reference numeral, 214, to show that they are the same value. As with the second drive initialization velocity 212 discussed above, the second decision initialization velocity 214 may be a spatial projection of a most-recently determined state (e.g., velocity) of the vehicle 102 spatially projected onto the last most-recently determined decision trajectory, e.g., the first decision trajectory 124a in this instance. Once the second decision initialization velocity 136 is determined, the decision planning system 120 determines a new decision trajectory, e.g., the second decision trajectory 124b. In the illustrated example, the pedestrians 104 may still be in the crosswalk 114 and thus the second decision trajectory 124b may look substantially the same as the first decision trajectory 124b. The second decision trajectory 124b could be different in other examples, including examples in which the planning system 120 determines that the vehicle should accelerate, e.g., because the crosswalk 114 clears, examples in which the decision planning system 120 determines that the vehicle 102 should stop quicker, e.g., because the crosswalk 114 has become crowded and some of the pedestrians 104 have started to cross the road 108 in the first lane 110, or other examples. To further illustrate the use of the projection of the vehicle 102 onto the first decision trajectory 124a, FIG. 1 also shows an elapsed portion 124a' of the first decision trajectory on the velocity profile generated as the second decision trajectory 126b. Specifically, the elapsed portion 124a' corresponds to the portion of the first decision trajectory 124a between the first decision initialization velocity 208 and the point 214. The first decision initialization velocity 208 is also shown on the elapsed portion 124a', to show that the decision initialization velocity has decreased, as a function of projecting the actual state of the vehicle 102 onto the previous decision trajectory, despite the fact that the vehicle has actually accelerated, per the first drive trajectory 126a and the second drive trajectory 126b.

The drive planning system 122 may use the second decision trajectory 124b as a reference for determining additional drive trajectories 126. For example, at time $t_3$, the drive planning system 122 generates the third drive trajectory 124c. As in the example of the second drive trajectory 126b, the drive planning system determines a third initialization state, e.g., a third drive initialization velocity 216, as a projection of a current (near-current or most-recently determined) state of the vehicle 102 onto the previously determined drive trajectory, e.g., the second drive trajectory 126b. This projection is also illustrated as the point on the second drive trajectory 126b (the point is also designated with reference numeral 216), corresponding to the time $t_3$. Unlike the second drive trajectory 126b, however, the third drive trajectory 126c may be determined based on the second decision trajectory 124b, e.g., instead of based on the first decision trajectory 124a. As illustrated, the third drive initialization velocity 216 is relatively closer to the second decision initialization velocity 214. As a result, the third drive trajectory 126c may more closely follow the second decision trajectory 124b. When the third drive trajectory 126c is implemented by a control system of the vehicle 102, there may be only a relatively small initial acceleration, after which the third drive trajectory 126c decelerates generally in the same manner as the second decision trajectory 124b, e.g., to stop the vehicle 102.

FIG. 2 also illustrates the next iteration of determining the drive trajectory 126. Specifically, FIG. 2 also illustrates the fourth drive trajectory 126d generated by the drive planning system 122 at the time $t_4$. In this example, the drive planning system 122 may determine a fourth drive initialization state, e.g., a fourth drive initialization velocity 218, as a projection of the vehicle 102 state on the third drive trajectory 126c at the time t4. This projection is also illustrated as the point (also designated with reference numeral 218) on the third drive trajectory 126c in FIG. 2. From the fourth initialization state, e.g., the fourth initialization velocity 218, the drive planning system 122 determines the fourth drive trajectory 126d, e.g., as a trajectory for closely approximating the second decision trajectory 124b. In the example, the fourth drive trajectory 126d is nearly identical to the second decision trajectory 124b. To further illustrate the use of the projection of the vehicle 102 onto the third drive trajectory 126c, FIG. 2 also shows an elapsed portion 126c' of the third drive trajectory 126c on the velocity profile generated as the fourth drive trajectory 126b. Specifically, the elapsed portion 126c' corresponds to the portion of the third drive trajectory 126c between the third initialization velocity 216 and the point 218.

Accordingly, FIG. 2 illustrates examples in which projected states are used as initialization states for iteratively determining trajectories at multiple planning systems. The first vehicle velocity timeline 202 shows a velocity of the vehicle 102 as the vehicle 102 is controlled according to the drive trajectories 126. As illustrated, the vehicle 102 may start at an initial velocity 220 that is slightly above the first decision trajectory initialization 208. As illustrated, because the vehicle is then controlled from the time $t_1$ to the time $t_2$ according to the first drive trajectory 126a, the vehicle 102 is to accelerate, e.g., along the portion of the first drive trajectory between the initialization velocity 20 and the time $t_2$. Thus, despite a desire to slow (and stop) the vehicle 102, the vehicle 102 is controlled to accelerate slightly between the time $t_1$ and the time $t_2$, because of differences between the decision trajectories, the actual state of the vehicle, and the drive trajectories. Similarly, between the time $t_2$ and the time $t_3$, the second drive trajectory 126b requires an acceleration, and between the time $t_3$ and the time $t_4$ the third drive trajectory 126c requires an acceleration. Accordingly, the velocity of the vehicle 102 continues to increase from time $t_1$ through time $t_4$, as illustrated. At some time after time $t_4$ and before time $t_5$, the fourth drive trajectory 126d begins to show a deceleration, and the vehicle begins to slow toward the stop. This deceleration generally begins at the point 222 shown in FIG. 2. For reference, the first vehicle velocity timeline 202 also shows, at time $T_1$, the first decision initialization velocity 208 and, at time $T_2$, the second decision initialization velocity 214. In this example, both are below the actual velocity of the vehicle 212. Moreover, despite the vehicle accelerating from $T_1$ to $T_2$, the decision initialization velocity decreases according to the examples just described. As noted above, depending upon the frequencies of the decision planning system 120 and the drive planning system 122, the acceleration in the example may persist for a fraction of a second, before the vehicle 102 begins to decelerate.

The second control timeline 204 shows an alternative approach to determining decision trajectories 224 and drive trajectories 226, e.g., using the decision planning system 120 and the drive planning system 122, respectively. As with the trajectories 124, 126 described above, the decision trajectories 224 may be trajectories determined from decision initialization states and drive initialization states, but the timeline 204 illustrates a different method of determining the decision initialization states. The timeline 204 may be indicative of a conventional process for determining decision initialization states.

More specifically, a first decision trajectory 224a may be a trajectory from a first initialization state, e.g., a first decision initialization velocity 228, at the time T1. In the timeline 204, the vehicle 102 is again being controlled to stop before the crosswalk 114. The timeline 204 assumes that the decision trajectories 224 are generated at the same frequency as the decision trajectories 124 and that the drive trajectories 226 are generated at the same frequency as the drive trajectories 126. However, in the example of the timeline 204, the decision initialization state is an actual state of the vehicle 102, e.g., the first decision initialization velocity 228 is an actual velocity of the vehicle 102 at the time $T_1$. Thus, the first decision trajectory 224a is a trajectory for stopping the vehicle 102 from its current state.

As with the techniques described above, a first drive trajectory 226a and a second drive trajectory 226b may be determined based at least in part on the first decision trajectory 224a. The first drive trajectory is illustrated as being initialized at a first drive initialization velocity 230 and the second drive trajectory 226b is illustrated as being initialized at a second drive initialization velocity 232. For purposes of this example, the drive initialization states may be projections of a vehicle state onto a previous drive trajectory, as in the examples described above.

At $T_2$, the decision planning system may determine a second decision trajectory 224b, which may be initialized at a second decision initialization state, e.g., a second initialization velocity 234. As discussed above, in this example, the decision initialization velocity is an actual velocity of the vehicle 102. Thus, the second decision initialization velocity 234 is higher than the first decision initialization velocity 228, e.g., because the vehicle 102 is accelerating between $T_1$ and $T_2$ in accordance with the first drive trajectory 226a and the second drive trajectory 226b. The drive planning system 122 may then determine a third drive trajectory 226c from a third drive initialization velocity 236 and a fourth drive trajectory 226d from a fourth drive initialization velocity 238. As with the examples described above, the third and fourth initialization velocities 236, 238 may be spatial projections of an actual state of the vehicle onto a last most-recently generated drive trajectory. Thus, as illustrated, both the third and fourth drive trajectories 226c, 226d have fairly significant initial accelerations, as those drive trajectories attempt to match the second decision trajectory 224b.

The second vehicle velocity timeline 206 illustrates the actual velocity of the vehicle as it is controlled according to the drive trajectories 226. Specifically, as illustrated, at each of $t_1$, $t_2$, $t_3$, and $t_4$, the vehicle accelerates, and more drastically than in the first vehicle velocity timeline 202. Moreover, the vehicle 102 continues to accelerate between the time $t_4$ and $t_5$, and, as will be appreciated, because the vehicle 102 has an increasing velocity, a next decision trajectory 224 will be initialized at a velocity even higher than the second drive initialization velocity 234. Accordingly, when compared to the control techniques illustrated by the timeline 128, the techniques illustrated by the timeline 204 may require a much more drastic deceleration. Also, the difference between the decision initialization state and the drive initialization state may not converge until much later in time, resulting in a drastic deceleration closer to the crosswalk 114. For example, subsequent drive trajectories 226 may continue to require initial acceleration as the drive trajectories 226 continue to try to approximate the decision trajectories 224. In these examples, the vehicle may have a continued acceleration for a longer period of time, before requiring a relatively drastic deceleration nearer the crosswalk 114. Actual trajectories of the vehicle controlled in accordance with timeline 204 may, then, be associated with uncomfortable controls due to increased jerkiness (due to high acceleration and then deceleration), stop hops, jumps, and the like. The techniques of FIG. 2, then, may result in a smoother ride for passengers, improved peace of mind for the pedestrians 104, and/or less wear on the vehicle 102. Moreover, although the example implementation mitigates late or quick stops, techniques described herein may also prevent false starts, early stops, hops (stopping and then moving a short distance to an intended stopping point), and the like, resulting from the divergence of the decision and drive trajectories in some conventional systems.

The example of FIG. 2 is for illustration only; techniques described herein can improve upon conventional control systems in most scenarios. For example, by using the projected initialization state as described, acceleration and deceleration events can be smoother. Moreover, the techniques are not limited to velocity and acceleration controls. Any vehicle trajectory characteristics can be initialized using techniques described herein. For instance, trajectories that require lateral movement, e.g., steering, or trajectories that change a vehicle's orientation may utilize the initialization techniques described herein.

FIG. 3 illustrates an example system that can implement trajectory initialization and generation in a vehicle, as described herein. In at least one example, the system 300 can include a vehicle 302, which can be the same as the vehicle 102 described above with reference to FIG. 1. The vehicle 302 can include one or more vehicle computing devices 304, one or more sensor systems 306, one or more communication connections 308, at least one direct connection 310, one or more drive modules 312, and data 314. In at least one example, the vehicle computing device(s) 304 can correspond to the vehicle computing device(s) 116 described above with reference to FIG. 1.

The vehicle computing device(s) 304 can include processor(s) 316 and memory 318 communicatively coupled with the processor(s) 316. In the illustrated example, the vehicle 302 is an autonomous vehicle; however, the vehicle 302 could be any other type of vehicle. In the illustrated example, the memory 318 of the vehicle computing device(s) 304 stores a localization system 320, a perception system 322, a prediction system 324, a planning system 326, a drive system 328, and one or more system controllers 330. Although these systems and components are illustrated, and will be described below, as separate components for ease of understanding, functionality of the various systems and controllers may be attributed differently than discussed. By way of non-limiting example, functionality attributed to the perception system 322 may be carried out by the localization system 320 and/or the prediction system 324. Fewer or more systems and components may be utilized to perform the various functionalities described herein. Furthermore, though depicted in FIG. 3 as residing in memory 318 for illustrative purposes, it is contemplated that the localization system 320, the perception component 322, the prediction system 324, the planning system 326, the drive system 328, and/or the one or more system controllers 330 can additionally, or alternatively, be accessible to the vehicle 302 (e.g., stored on, or otherwise accessible by, memory remote from the vehicle 302).

In at least one example, the localization system 320 can include functionality to receive data from the sensor system(s) 306 to determine a state, position and/or orientation of the vehicle 302 (e.g., one or more of an x-, y-, z-position, roll, pitch, or yaw). For example, the localization system 320 can include and/or request/receive a map of an environment (e.g., from the map storage 332) and can continuously determine a location and/or orientation of the vehicle 302 within the map. In some instances, the localization system 320 can utilize SLAM (simultaneous localization and mapping), CLAMS (calibration, localization and mapping, simultaneously), relative SLAM, bundle adjustment, non-linear least squares optimization, differential dynamic programming, or the like to receive image data, LIDAR data, radar data, IMU data, GPS data, wheel encoder data, and the like to accurately determine a location of the autonomous vehicle. In some instances, the localization system 320 can provide data to various components of the vehicle 302 to determine an initial position of an autonomous vehicle for generating a candidate trajectory for travelling in the environment. The position and/or orientation of the vehicle 302 determined by the localization system 320 may be projected onto a previous drive and/or decision trajectory to determine an initialization state for a next drive and/or decision trajectory, as described further herein. In some implementations, the localization system may also determine additional information about a current or near-current state of the vehicle 302 (e.g., velocity, acceleration, steering angle, or the like), which may also be used to determine an initialization state, as described herein. For example, the localization system 320 may determine the state of the vehicle at a predetermined frequency, which may be a higher frequency than the frequency at which the decision planning system 332 determines decision trajectories and/or than the frequency at which the drive planning system 334 determines drive trajectories. As described further herein, the most-recently calculated state of the vehicle may be projected, e.g., spatially projected, onto the last-calculated decision trajectory to determine an initialization state for a next decision trajectory and/or onto the last-calculated drive trajectory to determine an initialization state for a next drive trajectory.

In some instances, the perception system 322 can include functionality to perform object detection, segmentation, and/or classification. In some examples, the perception system 322 can provide processed sensor data that indicates a presence of an agent that is proximate to the vehicle 302, such as the pedestrians 104. The perception system 322 may also determine a classification of the entity as an entity type (e.g., car, pedestrian, cyclist, animal, building, tree, road surface, curb, sidewalk, unknown, etc.). For instance, the perception system 322 may compare sensor data to the agent information 128 in the agent information database 334 to determine the classification. In additional and/or alternative examples, the perception system 322 can provide processed sensor data that indicates one or more characteristics associated with a detected agent and/or the environment in which the agent is positioned. In some examples, characteristics associated with an agent can include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment can include, but are not limited to, a presence of another agent in the environment, a state of another agent in the environment, a time of day, a day of a week, a season, a weather condition, an indication of darkness/light, etc.

The prediction system 324 can access sensor data from the sensor system(s) 306, data from the data store 314, and, in some examples, perception data output from the perception system 322 (e.g., processed sensor data). In at least one example, the prediction system 324 can determine features associated with the agent based at least in part on the sensor data, the map data, and/or the perception data. Features can include an extent of an agent (e.g., height, weight, length, etc.), a pose of an agent (e.g., x-coordinate, y-coordinate, z-coordinate, pitch, roll, yaw), a velocity of an agent, an acceleration of an agent, and a direction of travel of an agent (e.g., a heading). Moreover, the prediction system 324 may be configured to determine a distance between an agent and a proximate driving lane, a width of a current driving lane, proximity to a crosswalk, semantic feature(s), interactive feature(s), etc.

The prediction system 324 can also analyze features of agents to predict future actions of the agents. For instance, the prediction system 324 can predict lane changes, decelerations, accelerations, turns, changes of direction, or the like. The prediction system 324 can send prediction data to the planning system 326 so the planning system 326 can determine trajectories for the vehicle 302, as described herein. For example, the planning system 326 can, using the prediction data, determine an appropriate velocity profile for controlling the vehicle 302 along a travel path, e.g., to stop before the crosswalk 114.

In general, the planning system 326 can determine a path, e.g., a travel path, along which the vehicle 302 can traverse through an environment. For example, the planning system 326 can determine various routes and trajectories and various levels of detail. The planning system 326 can determine a route to travel from a first location (e.g., a current location) to a second location (e.g., a target location). Further, the planning system 326 can generate an instruction for guiding the autonomous vehicle along at least a portion of the route from the first location to the second location. In at least one example, the planning system 326 can determine how to guide the autonomous vehicle from a first waypoint in a sequence of waypoints to a second waypoint in the sequence of waypoints. In examples described herein, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In more detail, the planning system 326 may include a route planning system 330, a decision planning system 332 (which may be the decision planning system 120), and a drive planning system 334 (which may be the drive planning system 122).

The route planning system 330 can be configured to determine a most efficient route to travel from a first location (e.g., a current location) to a second location (e.g., a target location). A route can be a sequence of waypoints for travelling between two locations. As non-limiting examples, waypoints may include streets, intersections, global positioning system (GPS) coordinates, etc. In at least one example, the route planning system 330 can perform a search, such as a graph search, on top of a map to identify a route to guide the autonomous vehicle 302 from a first location to a second location. As used herein, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planning system 330 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

The decision planning system 332 is configured to determine first trajectories, e.g., the decision trajectories 124. In at least one example, the decision planning system 332 can receive the route (e.g., the sequence of waypoints) determined by the route planning system 330 and can generate an instruction for guiding the autonomous vehicle 102 along at least a portion of the route from the first location to the second location. The decision planning system 332 may also receive information about a current state, e.g., a pose, a velocity, an acceleration, or the like, from the localization system 330. This information may include inertial information, as well as information in a coordinate frame, e.g., an x-y, local, global, relative, inertial, etc. coordinate frame. The decision planning system 332 can determine the decision trajectories 124 in the coordinate frame based on the route and the information from localization system 330. In at least one example, the decision planning system 332 can determine how to guide the autonomous vehicle 102 from a first waypoint in the sequence of waypoints to a second waypoint in the sequence of waypoints. In some examples, the instruction can be a trajectory, or a portion of a trajectory. In such examples, the decision planning system 332 can generate a sequence of actions (e.g., drive down the road, accelerate, change lanes, turn left, etc.) to guide the autonomous vehicle 102 along the route. A non-limiting example of a trajectory can be "stop the vehicle in 20 meters."

In at least one example, the decision planning system 332 can utilize one or more models and/or algorithms to determine an instruction for guiding the autonomous vehicle 102 from the first location to the second location in view of constraint(s). For instance, in at least one example, the decision planning system 332 can utilize a combination of temporal logic (e.g., linear temporal logic (LTL), signal temporal logic (STL), interval temporal logic (ITL), computational tree logic (CTL) property specification language (PSL), Hennessy-Milner logic (HML), etc.) and a search algorithm (e.g., policy tree search, Monte Carlo Tree Search (MCTS), exhaustive search, etc.) to determine one or more candidate trajectories and evaluate a performance of each of the potential instructions prior to determining which instruction to select.

The drive planning system 334 can receive the trajectory determined at the decision planning system 332 and can determine a second trajectory, e.g., a drive trajectory 126, for controlling the vehicle. The drive planning system 334 can determine the trajectories based on objects identified in the environment. In at least one example, the drive planning system 334 can access, receive, and/or determine real-time processed sensor data to determine object(s) in the environment which the autonomous vehicle 102 is travelling. In the at least one example, the drive planning system 334 can process the instruction in view of the real-time processed sensor data. For example, the drive planning system 334 may determine the drive trajectories in an inertial coordinate system, independent of an x-y coordinate system (e.g., the x-y coordinate system in which the decision trajectories are calculated).

The drive planning system 334 can leverage model(s) and/or algorithm(s), constraint(s), and/or cost(s) to optimize the trajectory. For instance, the drive planning system 334 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle 302 can be optimized to include a positive, a negative, or a zero value. In at least one example, a rotation of the autonomous vehicle 302 can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the drive planning system 334 can generate an output trajectory, e.g., the drive planning trajectory 126.

Thus, both the decision planning system 332 and the drive planning system 334 are configured to determine trajectories. Both the decision planning system 332 and the drive planning system 334 can access, receive, and/or determine real-time processed sensor data and poses of the autonomous vehicle 102 to determine the trajectories. However, the drive planning system 334 can utilize a more detailed model of the autonomous vehicle 302 than the decision planning system 332. As a result, processing performed by the drive planning system 334 may be more computationally expensive than processing performed by the decision planning system. In some examples, the decision planning system 332 and the drive planning system 334 can determine trajectories in different coordinate systems. Coordinate systems may include inertial coordinate systems, track-based coordinate systems, map-based coordinate systems, or the like. In an example described above, the decision planning system may determine the decision trajectories 124 in a first (e.g., an x-y) coordinate system, whereas the drive planning system 334 may determine the drive trajectories 126 in a second (e.g., an inertial) coordinate system, separate from the first coordinate system. For example, the drive planning system 334 may determine the drive trajectories as spatial projections. Of course, any combination of coordinate systems and reference frames is contemplated.

The trajectories may include instructions for controlling any of a number of attributes of the vehicle's travel. For example, the trajectory may include information about a velocity of the vehicle, as in the example of FIG. 1. In other examples, the trajectory may include information about an acceleration, position, steering, or the like.

As also illustrated in FIG. 3, the decision planning system 332 can have a first frequency of operation (e.g., $f_1$) and the drive planning system 334 can have a second frequency of operation (e.g., $f_2$). In at least one example, the first frequency can be a relatively lower frequency (e.g., 1-10 Hertz) and the second frequency can be a higher frequency (e.g., 20-40 Hz). That is, in at least one example, the decision planning system 332 can process data (e.g., to generate the decision trajectories 124) with less frequency than the drive planning system 334 processes data (e.g., generates the drive trajectories 126), as generally described above in accordance with FIG. 1. The different frequencies can enable the system 300 to distribute computational resources to modules based on a frequency at which individual modules receive updated data and/or a time period in which individual modules need to process and output data and/or based on safety considerations. In practice, and as illustrated in FIG. 1, the differing frequencies may result in multiple drive trajectories 126 being determined for each decision trajectory 124.

The decision planning system 332 and the drive planning system 334 may include functionality for determining respective trajectories from initialization states. In some examples, the decision planning system 332 can receive information about a pose or other state of the vehicle 102 and can use the current pose and/or state of the vehicle to determine the initialization state. For example, the localization system 320 may determine the current state of vehicle at a predetermined frequency, and the most-recently determined state of the vehicle may be projected, e.g., as a spatial projection, on the last-determined decision trajectory to determine an initialization state for a next decision trajectory. Similarly, the most-recently determined state of the vehicle may be projected, e.g., as a spatial projection, on the last-determined drive trajectory to determine an initialization state for a next drive trajectory. For example, the localization system 320 may determine the current state at a higher frequency (e.g., 80-100 Hz), than one or both of the frequencies at which the decision and drive trajectories are determined. In the example of FIG. 1, in which the velocity is a one-dimensional value, an initialization drive velocity for a trajectory determined at $t_1$ may also be determined as a projected velocity of the vehicle at $t_1$ on a velocity profile created at a time before $t_1$. In other implementations, e.g., in higher dimensions, the spatial projection of the current state of the vehicle may not be this projected velocity.

The drive system 328 generally can include functionality for controlling the vehicle in accordance with drive trajectories 126. For example, the drive system 328 may include an execution system 336 that can receive the drive trajectory from the drive planning system 334 and can compute commands for actuating steering and acceleration of the autonomous vehicle 102 to enable the autonomous vehicle 102 to follow the drive trajectory. In at least one example, the execution system 336 can receive the drive trajectory and can compute a steering angle and velocity to enable the autonomous vehicle 102 to follow the drive trajectory. In some examples, the execution system 336 can also track the vehicle as it executes the drive trajectory. Thus, for example, the execution system 336 can iteratively track a state, e.g., local position, velocity, acceleration, or the like, of the vehicle 102, determine a difference between the state and the drive trajectory, and control the vehicle 102 to minimize the difference. As illustrated in FIG. 2, the execution system 336 can have a third operating frequency (e.g., $f_3$), which may be a frequency at which the execution system 336 performs this iterative process. For instance, the third operating frequency may be higher than the second operating frequency at which the drive planning system 334 generates drive trajectories. For example, the third operating frequency may be 100 Hz. In some examples, the drive system 328 and/or the execution system 336 may include a tracker for tracking steady state errors, errors over time, and/or instantaneous tracking errors.

In some implementations, the vehicle computing device(s) 302, e.g., implementing the prediction system 324, the planning system 326, and/or the drive system 328 may consider discrete times in a decision horizon, which may be less than 1 second to several seconds or more. At each discrete time step, the vehicle computing device(s) 304 may determine a reaction for the vehicle based on information about static objects in the environment, e.g., based on an assumption that such objects will remain static, and predictions of dynamic entities, e.g., determined by the prediction system 324. Thus, at each time step, the vehicle computing device(s) 304, e.g., the planning system 326, may evaluate a position of the vehicle, positions of other dynamic objects, and positions of the static objects.

While the decision planning system 332 and the drive planning system 334 are illustrated as being a part of the planning system 326, one or more of the functionalities of the decision planning system 332 and the drive planning system 334 may be separate from the planning system 326.

In at least one example, the localization system 320, the perception system 322, the prediction system 324, and/or the planning system 326 can process sensor data, as described above, and can send their respective outputs over network(s) 340, to computing device(s) 342. In at least one example, the localization system 320, the perception system 322, the prediction system 324, and/or the planning system 326 can send their respective outputs to the computing device(s) 342 at a particular frequency, after a lapse of a predetermined period of time, in near real-time, etc.

In at least one example, the vehicle computing device(s) 304 can include one or more system controllers 338, which can be configured to control steering, propulsion, braking, safety, emitters, communication, and other systems of the vehicle 302. These system controller(s) 330 can communicate with and/or control corresponding systems of the drive module(s) 312 and/or other components of the vehicle 302. For example, the system controllers 330 may cause the vehicle to traverse along a drive path determined by the planning system 326, as described herein.

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304. Additionally and/or alternatively, the sensor system(s) 306 can send sensor data, via the network(s) 340, to the computing device(s) 342 at a particular frequency, after a lapse of a predetermined period of time, in near real-time, etc.

The vehicle 302 can also include communication connection(s) 308 that enable communication between the vehicle 302 and other local or remote computing device(s). For instance, the communication connection(s) 308 can facilitate communication with other local computing device(s) on the vehicle 302 and/or the drive module(s) 312. Also, the communication connection(s) 308 can allow the vehicle to communicate with other nearby computing device(s) (e.g., other nearby vehicles, traffic signals, etc.). The communications connection(s) 308 also enable the vehicle 302 to communicate with a remote teleoperations computing device or other remote services.

The communications connection(s) 308 can include physical and/or logical interfaces for connecting the vehicle computing device(s) 302 to another computing device or a network, such as network(s) 340. For example, the communications connection(s) 308 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 302 can include drive module(s) 312. In some examples, the vehicle 302 can have a single drive module 312. In at least one example, if the vehicle 302 has multiple drive modules 312, individual drive modules 312 can be positioned on opposite ends of the vehicle 302 (e.g., the front and the rear, etc.). In at least one example, the drive module(s) 312 can include sensor system(s) to detect conditions of the drive module(s) 312 and/or the surroundings of the vehicle 302. By way of example and not limitation, the sensor system(s) 306 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 312. In some cases, the sensor system(s) on the drive module(s) 312 can overlap or supplement corresponding systems of the vehicle 302 (e.g., the sensor system(s) 306). Information from the sensor system(s) on the drive modules 312 may be used by the localization system 320 to determine a current state of the vehicle, for example.

The drive module(s) 312 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 312 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 312. Furthermore, the drive module(s) 312 also include communication connection(s) that enable communication by the respective drive module with other local or remote computing device(s).

The data 314 may include any number of data types accessible by or useful to the vehicle 302. For instance, the data 314 may include a map storage storing one or more maps, e.g., for determining decision trajectories, as described herein. A map can be any number of data structures modeled in two dimensions or three dimensions that are capable of providing information about an environment, such as, but not limited to, topologies (such as intersections), streets, mountain ranges, roads, terrain, and the environment in general. In other examples, the data 314 may include one or more models, constraints, policies, logical rules, predictive data, or the like. For example, the models may include models of the vehicle 102, models of other objects in the environment, decision models, or the like.

The vehicle 302 can send sensor data to the computing device(s) 342, via the network(s) 340. In some examples, the vehicle 302 can send raw sensor data to the computing device(s) 342. In other examples, the vehicle 302 can send processed sensor data and/or representations of sensor data to the computing device(s) 342 (e.g., data output from the localization system 320, the perception system 322, the prediction system 324, and/or the planning system 326). In some examples, the vehicle 302 can send sensor data to the computing device(s) 342 at a particular frequency, after a lapse of a predetermined period of time, in near real-time, etc.

The computing device(s) 342 can receive the sensor data (raw or processed) from the vehicle 302 and/or one or more other vehicles and/or data collection devices, and can determine trajectories as described herein. In at least one example, the computing device(s) 342 can include processor(s) 344 and memory 346 communicatively coupled with the processor(s) 344. In the illustrated example, the memory 346 of the computing device(s) 342 stores a planning component 348, for example.

The planning component 348 may correspond to the planning system 326 described above. For example, the planning component 348 may process data to determine one or more routes or trajectories, e.g., decision trajectories and/or drive trajectories. For example, the routes and/or trajectories may be determined at the computing device(s) 342 and transferred back to the vehicle 302, e.g., via the networks 340, for execution by the drive system 328. Moreover, the planning system 348 can perform one or more operations as described above and ascribed to the localization system 320, the perception system 322, and/or the prediction system 324.

The processor(s) 316 of the vehicle 302 and the processor(s) 344 of the computing device(s) 342 can be any suitable processor capable of executing instructions to process data and perform operations as described herein. By way of example and not limitation, the processor(s) 316, 344 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 346 are examples of non-transitory computer-readable media. Memory 318 and 346 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 3 is illustrated as a distributed system, in alternative examples, components of the vehicle 302 can be associated with the computing device(s) 342 and/or components of the computing device(s) 342 can be associated with the vehicle 302. That is, the vehicle 302 can perform one or more of the functions associated with the computing device(s) 342, and vice versa. Moreover, although various systems and components are illustrated as being discrete systems, the illustrations are examples only, and more or fewer discrete systems may perform the various functions described herein.

Figure 4:
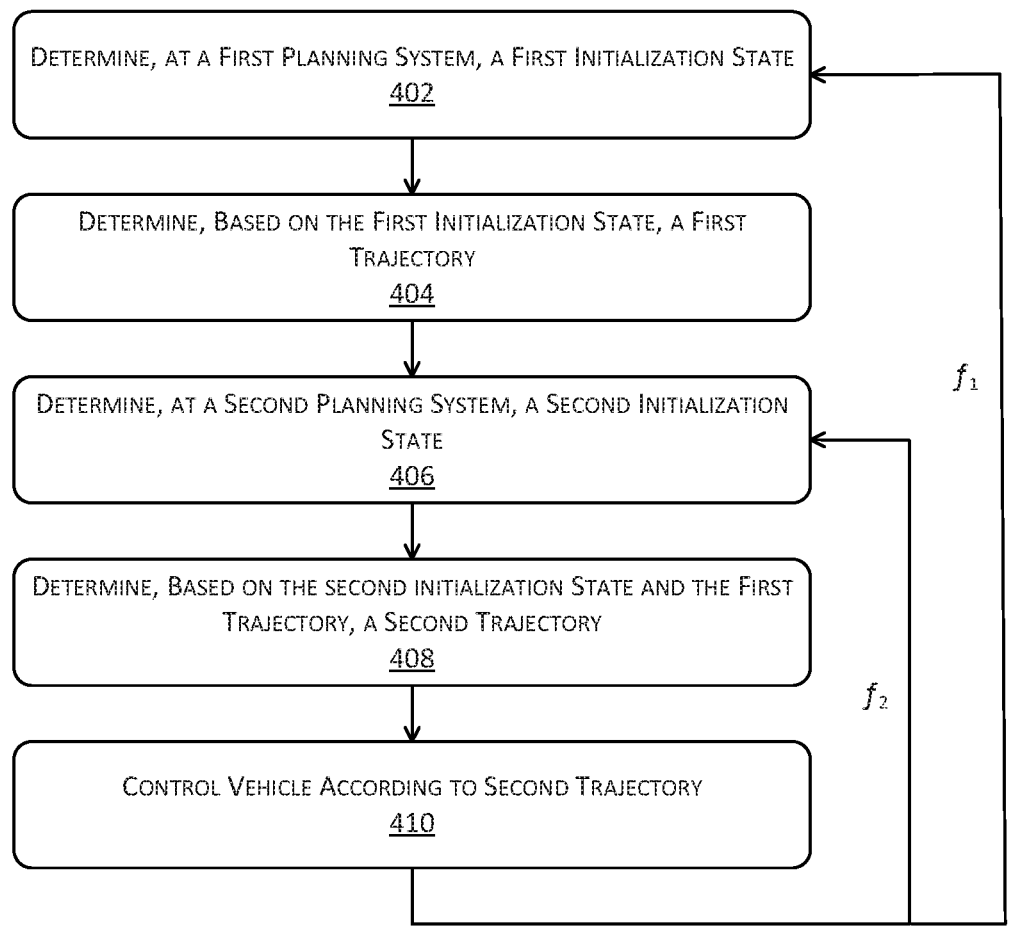
FIG. 4 is a flowchart illustrating an example method for navigating a vehicle through an environment using trajectory initialization and generation, as described herein.

FIG. 4 is a flowchart showing an example process involving trajectory initialization determination, and execution as described herein. Specifically, FIG. 4 illustrates a process 400 in which multiple planning systems are used to determine trajectories. The method illustrated in FIG. 4 is described with reference to the vehicles 102 and/or 302 shown in FIGS. 1 and 3 for convenience and ease of understanding. However, the process illustrated in FIG. 4 is not limited to being performed using the vehicles 102, 302, and can be implemented using any of the other vehicles described in this application, as well as vehicles other than those described herein. Moreover, the vehicles 102, 302 described herein are not limited to performing the method illustrated in FIG. 4.

The process 400 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the process 400 can be combined in whole or in part with other methods.

At 402, the process 400 can include determining, at a first planning system, a first initialization state. For example, and as described above, a vehicle 302 may include or be associated with one or more computing devices 304 that include the decision planning system 332. The decision planning system 332 may receive information from the route planning system 330, the one or more sensor systems 306, the localization system 320, the perception system 322, the prediction system 324, and/or other sources to determine the initialization state. For instance, the initialization state may be determined based on a pose or current state of the vehicle 102. As discussed above, the decision initialization state may be based at least in part on a spatial projection of the current state of the vehicle onto a previous decision trajectory, e.g., the last-determined decision trajectory. In some instances, the decision trajectories may be iteratively determined, and the first initialization state may be determined as a spatial projection of a current state of the vehicle, e.g., as determined by the localization system 320 onto the last calculated trajectory. In examples, the first initialization state may include information about a velocity, acceleration, steering angle, vehicle position, or other attributes associated with vehicle control.

At 404, the method 400 can include determining, based on the first initialization state, a first trajectory. In the example illustrated in FIG. 1 and discussed above, the decision planning system 332 may determine a decision trajectory 124 based on the first initialization velocity. The decision trajectory 124 will be a trajectory to stop the vehicle 102 short of the crosswalk 114. Because the example includes only longitudinal motion, the decision trajectory 124 may include only information about acceleration and/or velocity. In other examples, decision trajectories may include information about lateral changes, e.g., steering parameters or vehicle position, or other control-related changes. Of course, any change in vehicle state (position, orientation, yaw rate, acceleration, velocity, etc.) is contemplated.

At 406, the process 400 can include determining, at a second planning system, a second initialization state. For example, and as described above, a vehicle 302 may include or be associated with one or more computing devices 304 that include the drive planning system 334. As discussed above, the second initialization state may be based at least in part on a projected state of the vehicle relative to a previous drive trajectory. In some instances, the drive trajectories may be iteratively determined, and the second initialization state may be determined as a spatial projection of a current state of the vehicle onto the last calculated drive trajectory. In examples, the second initialization state may include information about velocity, acceleration, steering angle, vehicle position, and/or other attributes associated with vehicle control.

At 408, the process 400 can include determining, based on the second initialization state, a second trajectory. In the example illustrated in FIG. 1 and discussed above, the drive planning system 122, 334 may determine a drive trajectory 126 based on the second initialization velocity. The drive trajectory 126 may be a trajectory for controlling the vehicle generally along the decision trajectory 124, but, when the second initialization state is different from the first initialization state, the drive trajectory 124 will be different from the decision trajectory. The drive trajectory may also be based at least in part on constraints, rules, logic, or other parameters. For example, the drive trajectory may be determined to avoid sudden acceleration or steering, e.g., to promote rider comfort. The decision trajectory 124 may include information about any control parameters of the vehicle, including acceleration, velocity, steering, vehicle position, or the like.

At 410, the process 400 can include controlling the vehicle according to the second trajectory. As described above, the vehicle computing device(s) 304 can include the drive system 328 and one or more system controllers 330, which can be configured to control steering, propulsion, braking, safety, emitters, communication, and other systems of the vehicle 302. These system controller(s) 330 can communicate with and/or control corresponding systems of the drive module(s) 314 and/or other components of the vehicle 302. In at least one example, the drive system and/or the system controller(s) 330 can receive the drive trajectory 126 and can communicate with and/or control corresponding systems of the drive module(s) 314 and/or other components of the vehicle 302 such to cause the vehicle 302 to navigate along the trajectory. Moreover, the drive system 328 can include the execution system 336, which may iteratively confirm that the vehicle is following the drive trajectory, e.g., by receiving sensor data from the sensor system(s) 306 and controlling the drive module(s) 312, e.g., in near-real time.

As also illustrated in FIG. 3, the process 400 may be iteratively performed, such that, after 410, processing may return to 402 and/or to 406. 402 may be performed at a first control frequency $f_1$ and 406 may be performed at a second control frequency $f_2$. For example, the first control frequency $f_1$ may be lower than the second control frequency $f_2$. In some instances, the first control frequency $f_1$ may be between about 1 Hz and 10 Hz, and the second control frequency $f_2$ may be between about 30 and 80 Hz. Accordingly, and as discussed in more detail above, multiple drive trajectories can be calculated based on each decision trajectory.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: one or more processors; and memory storing processor-executable instructions that, when executed by the one or more processors, configure the vehicle to: determine a first vehicle state, the first vehicle state including at least a first vehicle speed of the vehicle in the environment; determine, based at least in part on the first vehicle speed and a first previous trajectory, a first initialization speed; determine a first trajectory for controlling the vehicle, the first trajectory based at least in part on a change in speed of the vehicle from the first initialization speed to a desired speed; determine a second vehicle state, the second vehicle state including at least a second vehicle speed of the vehicle; determine, based at least in part on the second vehicle speed and a second previous trajectory, a second initialization speed different from the first initialization speed; determine, based at least in part on the first trajectory, a second trajectory for controlling the vehicle, the second trajectory based at least in part on a change in speed of the vehicle from the second initialization speed to the desired speed; and control the vehicle based at least in part on the second trajectory.

B: The vehicle of example A, wherein the first trajectory is one of a plurality of first trajectories iteratively determined at a first frequency and the second trajectory is one of a plurality of second trajectories iteratively determined at a second frequency higher than the first frequency.

C: The vehicle of example A or example B, wherein: the first initialization speed is determined at a first time; the first previous trajectory is a most-recently determined, prior to the first time, one of the first trajectories; the second initialization speed is determined at a second time; and the second previous trajectory is a most-recently determined, prior to the second time, one of the second trajectories.

D: The vehicle of any one of example A through example C, wherein the first vehicle state and the second vehicle state are vehicle states determined at a third frequency higher than the second frequency.

E: The vehicle of any one of example A through example D, wherein: the first vehicle state comprises a vehicle state determined immediately prior to the first time and the second vehicle state comprises a vehicle state determined immediately prior to the second time.

F: The vehicle of any one of example A through example E, wherein a first planning system determines the first trajectory and a second planning system determines the second trajectory.

G: The vehicle of any one of example A through example F, wherein the first trajectory is determined in a first coordinate frame and the second trajectory is determined in a second coordinate frame.

H: An example method includes: determining a first initialization state for a vehicle, based at least in part on a first previous trajectory; determining, based on the first initialization state, a first trajectory for the vehicle; determining a second initialization state for the vehicle, based at least in part on a second previous trajectory, the second initialization state differing from the first initialization state; determining, based at least in part on the second initialization state and the first trajectory, a second trajectory for the vehicle; and controlling the vehicle based at least in part on the second trajectory.

I: The method of example H, wherein the first trajectory is one of a plurality of first trajectories iteratively determined at a first frequency and the second trajectory is one of a plurality of second trajectories iteratively determined at a second frequency higher than the first frequency.

J: The method any one of example H or example I, wherein: the first initialization state is determined at a first time; the first previous trajectory is a most-recently determined one of the plurality of first trajectories, prior to the first time; the second initialization state is determined at a second time; and the second previous trajectory is a most-recently determined one of the plurality of second trajectories, prior to the second time.

K: The method any one of example H through example J, further comprising: determining a plurality of states of the vehicle, the plurality of states being iteratively determined at a third frequency higher than the second frequency, wherein the first initialization state is determined based at least in part on a first state of the plurality of states, and wherein the second initialization state is determined based at least in part on a second state of the plurality of states.

L: The method of example H through example K, wherein the first initialization state is a spatial projection of the first state onto the first previous trajectory and the second initialization state is a spatial projection of the second state onto the second previous trajectory.

M: The method of example H through example L, wherein: the first initialization state is determined at a first time; the first state is a most-recently determined one of the states of the vehicle, prior to the first time; the second initialization state is determined at a second time; and the second state is a most-recently determined one of the states of the vehicle, prior to the second time.

N: The method of example H through example M, wherein: the first initialization state comprises a first speed of the vehicle; the first trajectory includes first information about a first acceleration for controlling the vehicle from the first speed to a desired speed; the second initialization state comprises a second speed of the vehicle; and the second trajectory includes second information about a second acceleration for controlling the vehicle from the second speed to the desired speed, the second speed differing from the first speed.

O: The method of example H through example N, wherein at least one of the first trajectory or the second trajectory comprises information about at least one of an acceleration, a velocity, steering, or a vehicle position.

P: Example non-transitory computer-readable medium having a set of instructions that, when executed, cause one or more processors to perform operations comprising: determining a first initialization state for a vehicle, the first initialization state being based at least in part on a first previous trajectory; determining, based on the first initialization state, a first trajectory for the vehicle; determining, a second initialization state for the vehicle, the second initialization state being based at least in part on a second previous trajectory and differing from the first initialization state; determining, based at least in part on the second initialization state and the first trajectory, a second trajectory for the vehicle; and controlling the vehicle based at least in part on the second trajectory.

Q: The non-transitory computer-readable medium of example P, wherein the first trajectory is determined iteratively at a first frequency and the second trajectory is determined iteratively at a second frequency higher than the first frequency.

R: The non-transitory computer-readable medium of example P or example Q, the operations further comprising: determining a plurality of states of the vehicle, the plurality of states being iteratively determined at a third frequency higher than the second frequency, wherein the first initialization state is determined as a spatial projection of a first state of the plurality of states onto the first previous trajectory, and wherein the second initialization state is determined as a spatial projection of a second state of the plurality of states onto the second previous trajectory.

S: The non-transitory computer-readable medium of example P or example R, wherein a first planning system determines the first trajectory and a second planning system determines the second trajectory.

T: The non-transitory computer-readable medium of example P or example S, wherein at least one of the first trajectory or the second trajectory comprises information about at least one of an acceleration, a velocity, steering, or a vehicle position.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:
1. A vehicle comprising:
one or more processors; and
non-transitory computer-readable memory storing processor-executable instructions that, when executed by the one or more processors, configure the vehicle, while the vehicle is traversing an environment, to:
generate, via implementation of a first planning system, a first trajectory of a plurality of first planned trajectories for the vehicle;
generate, via implementation of a second planning system, a first trajectory of a plurality of second planned trajectories for the vehicle, the plurality of second planned trajectories being based on at least one of the plurality of first planned trajectories and additional information;

determine a first current vehicle state, the first current vehicle state including at least a first vehicle speed of the vehicle in the environment;

determine, based at least in part on the first vehicle speed and the first trajectory of the plurality of first planned trajectories, a first initialization speed;

generate, via implementation of the first planning system, a second trajectory of the plurality of first planned trajectories, the second trajectory of the plurality of first planned trajectories based at least in part on a change in speed of the vehicle from the first initialization speed to a desired speed;

determine, after generation of the second trajectory of the plurality of first planned trajectories, a second current vehicle state, the second current vehicle state including at least a second current vehicle speed of the vehicle;

determine, via implementation of the second planning system and based at least in part on the second current vehicle speed and the first trajectory of the plurality of second planned trajectories, a second initialization speed different from the first initialization speed;

determine, based at least in part on the second initialization speed and the second trajectory of the plurality of first planned trajectories, a second trajectory of the plurality of second planned trajectories; and control the vehicle to implement the second trajectory of the plurality of second planned trajectories, wherein the instructions, when executed by the one or more processors, also configure the vehicle to iteratively generate individual ones of the plurality of first planned trajectories or individual ones of the plurality of second planned trajectories at a control frequency while the vehicle is traversing the environment.

2. The vehicle of claim 1, wherein the instructions further configure the vehicle to:

iteratively generate, via implementation of the first planning system, the individual ones of the plurality of first planned trajectories at a first control frequency; and iteratively generate, via implementation of the second planning system, the individual ones of the plurality of second planned trajectories at a second control frequency, wherein the second control frequency is higher than the first control frequency.

3. The vehicle of claim 1, wherein:

the first initialization speed is determined at a first time;

the first trajectory of the plurality of first planned trajectories is a most-recently generated, prior to the first time, one of the plurality of first planned trajectories;

the second initialization speed is determined at a second time after the first time; and the first trajectory of the plurality of second planned trajectories is a most-recently generated, prior to the second time, one of the plurality of the second planned trajectories.

4. The vehicle of claim 3, wherein the first current vehicle state and the second current vehicle state are current vehicle states, and the instructions further configure the vehicle to determine the current vehicle states iteratively at a third frequency higher than the second frequency.

5. The vehicle of claim 4, wherein:

the first current vehicle state comprises a first of the vehicle states most recently determined prior to the first time and the second current vehicle state comprises a second of the vehicle states most-recently determined prior to the second time.

6. The vehicle of claim 1, wherein the additional information comprises at least one of a passenger preference, capabilities of the vehicle, or wear on the vehicle.

7. The vehicle of claim 1, wherein the plurality of first planned trajectories are determined in a first coordinate frame and the plurality of second planned trajectories are determined in a second coordinate frame.

8. A method comprising:

determining a first trajectory of a plurality of first planned trajectories, the plurality of first planned trajectories being planned trajectories along which a vehicle is to travel to a destination;

determining, based at least in part on the first trajectory of the plurality of first planned trajectories, a first initialization state for the vehicle;

determining, based on the first initialization state, a second trajectory of the plurality of first planned trajectories;

determining, based at least in part on the second trajectory of the plurality of first planned trajectories, a first trajectory of a plurality of second planned trajectories, the plurality of second planned trajectories being planned trajectories based on at least one of the plurality of first planned trajectories and being implemented by the vehicle to travel to the destination;

determining, based at least in part on the first trajectory of the plurality of second planned trajectories, a second initialization state for the vehicle, the second initialization state differing from the first initialization state;

determining, based at least in part on the second initialization state and the second trajectory of the plurality of first planned trajectories, a second trajectory of the plurality of second planned trajectories, the second trajectory of the plurality of second planned trajectories to be implemented at the vehicle to follow the second trajectory of the plurality of first planned trajectories; and controlling the vehicle to follow the second trajectory of the plurality of second planned trajectories, wherein the method further comprises iteratively determining individual ones of the plurality of first planned trajectories at a first control frequency or iteratively determining individual ones of the plurality of second planned trajectories at a second control frequency while the vehicle is traversing the environment.

9. The method of claim 8, wherein the second control frequency is higher than the first control frequency.

10. The method of claim 9, wherein:

the first initialization state is determined at a first time;

the first trajectory of the plurality of first planned trajectories is a most-recently determined one of the plurality of first planned trajectories, prior to the first time;

the second initialization state is determined at a second time; and the first trajectory of the plurality of second planned trajectories is a most-recently determined one of the plurality of second planned trajectories, prior to the second time.

11. The method of claim 9, further comprising:

determining a plurality of current states of the vehicle, the plurality of current states being iteratively determined at a third frequency higher than the second control frequency, wherein the first initialization state is further determined based at least in part on a first current state of the plurality of current states, and wherein the second initialization state is determined based at least in part on a second current state of the plurality of current states.

12. The method of claim 11, wherein the first initialization state is a spatial projection of the first current state onto the first trajectory of the plurality of first planned trajectories and the second initialization state is a spatial projection of the second current state onto the first trajectory of the plurality of second planned trajectories.

13. The method of claim 11, wherein:
the first initialization state is determined at a first time;
the first current state is a most-recently determined one of the current states of the vehicle, prior to the first time;
the second initialization state is determined at a second time; and
the second current state is a most-recently determined one of the current states of the vehicle, prior to the second time.

14. The method of claim 8, wherein:
the first initialization state comprises a first speed of the vehicle;
the second trajectory of the plurality of first planned trajectories includes first information about a first acceleration for controlling the vehicle from the first speed to a desired speed;
the second initialization state comprises a second speed of the vehicle; and
the second trajectory of the plurality of second planned trajectories includes second information about a second acceleration for controlling the vehicle from the second speed to the desired speed, the second speed differing from the first speed.

15. The method of claim 8, wherein at least one of the second trajectory of the plurality of first planned trajectories or the second trajectory of the plurality of second planned trajectories comprises information about at least one of an acceleration, a velocity, steering, or a vehicle position.

16. Non-transitory computer-readable medium having a set of instructions that, when executed, cause one or more processors to perform operations comprising:
determining, iteratively at a first control frequency, a plurality of first planned trajectories, the plurality of first planned trajectories comprising planned trajectories along which a vehicle is to travel, the determining the plurality of first planned trajectories comprising:
determining a first initialization state for the vehicle, the first initialization state being based at least in part on a first current state of the vehicle at a first time and a first trajectory of the plurality of first planned trajectories; and
determining, based on the first initialization state, a second trajectory of the plurality of first planned trajectories comprising an updated trajectory along which the vehicle is to travel;
determining a second initialization state for the vehicle, the second initialization state differing from the first initialization state and being based at least in part on a second current state of the vehicle at a second time;
determining, iteratively at a second control frequency, a plurality of second planned trajectories the second planned trajectories being planned trajectories for implementing the plurality of first planned trajectories at the vehicle based at least in part on additional information associated with the vehicle, the determining the plurality of second planned trajectories comprising:
determining, based at least in part on the second initialization state and the second trajectory of the plurality of first planning system trajectories, a trajectory of the plurality of second planned trajectories; and
controlling the vehicle to implement controls to follow the trajectory of the plurality of second planned trajectories.

17. The non-transitory computer-readable medium of claim 16, wherein the additional information associated with the vehicle comprises at least one of a passenger preference, capabilities of the vehicle, or wear on the vehicle.

18. The non-transitory computer-readable medium of claim 17, the operations further comprising:
determining additional trajectories of the plurality of second planned trajectories, the trajectory of the plurality of second planned trajectories and the additional trajectories of the plurality of second planned trajectories being determined iteratively at the second control frequency; and
determining a plurality of current states of the vehicle, including the first current state and the second current state, iteratively at a third frequency higher than the second control frequency,
wherein the determining the first initialization state comprises determining a spatial projection of the first current state onto the first trajectory of the plurality of first planned trajectories, and
wherein the determining the second initialization state comprises determining a spatial projection of the second current state of the plurality of current states onto a most-recently determined, relative to the trajectory of the plurality of second planned trajectories, one of the plurality of second planned trajectories.

19. The non-transitory computer-readable medium of claim 18, wherein the first trajectory of the plurality of first planned trajectories and the second trajectory of the plurality of first planned trajectories are successively-determined trajectories of the plurality of first planned trajectories.

20. The non-transitory computer-readable medium of claim 16, wherein at least one of the first trajectory of the plurality of first planned trajectories, the second trajectory of the plurality of first planned trajectories, or the trajectory of the plurality of second planned trajectories comprises information about at least one of an acceleration, a velocity, steering, or a vehicle position.

* * * * *